United States Patent [19]

Hibbs et al.

[11] Patent Number: 5,521,852
[45] Date of Patent: May 28, 1996

[54] METHOD AND SYSTEM FOR DESIGNING LIGHTING INSTALLATIONS

[75] Inventors: John D. Hibbs, Boulder, Colo.; Douglas J. Stang, Reynoldsburg, Ohio

[73] Assignee: Holophane Lighting, Inc., Newark, Ohio

[21] Appl. No.: 146,576

[22] Filed: Oct. 29, 1993

[51] Int. Cl.[6] .......................... G06F 15/00; G01B 11/00; G02F 1/00

[52] U.S. Cl. .................. 364/578; 364/512; 364/550; 356/375; 356/121; 395/118; 395/119; 395/120; 395/121; 395/126

[58] Field of Search .................................... 364/550, 578, 364/571.02, 709.02, 512, 578; 356/375, 121; 382/1, 28; 315/158; 395/118–121, 126

[56] References Cited

U.S. PATENT DOCUMENTS

| | | | |
|---|---|---|---|
| 3,818,198 | 6/1974 | Walker et al. | 364/571.02 |
| 3,978,332 | 8/1976 | Taitavull | 240/551 R |
| 4,126,395 | 11/1978 | Ross et al. | 356/375 |
| 4,347,461 | 8/1982 | Carlson | 315/158 |
| 4,878,247 | 10/1989 | Wester-Ebbinghaus et al. | 382/1 |
| 5,027,307 | 6/1991 | Kusmer | 364/708.02 |
| 5,061,997 | 10/1991 | Rea et al. | 364/550 |
| 5,253,036 | 10/1993 | Ashdown | 356/121 |
| 5,268,996 | 12/1993 | Steiner et al. | 395/126 |
| 5,307,295 | 4/1994 | Taylor et al. | 364/578 |
| 5,329,431 | 7/1994 | Taylor et al. | 362/85 |
| 5,341,439 | 8/1994 | Hsu | 382/28 |

OTHER PUBLICATIONS

Genesys Lighting Work Station Software, Copyright 1990, Genlyte Inc.
Genesys Lighting Work Station Software, Copyright 1990.
Genesys Lighting Work Station Software, Reference Manual, Copyright 1990.
Genesis Lighting Work Station Software, Version 2.50 Documentation Addendum no publication date.
Genesys Lighting Work Station Software, Version 3.0 Documentation Addendum no publication date.
Lite–Pro Software, Version 2.0, Copyright 1994.
Luxicon Software, 1.0, no date.
Lumen–Micro Software, Version 5.0, Copyright 1990.

Primary Examiner—Edward R. Cosimano
Assistant Examiner—Kamini Shah
Attorney, Agent, or Firm—Brooks & Kushman

[57] ABSTRACT

A method and system for designing a lighting installation. The system includes a processor for executing the method, which includes generating lighting area input data signals based on selected parameters associated with a lighting area, and generating luminaire input data signals based on selected parameters associated with a luminaire. The method also includes processing the lighting area input data signals to obtain a lighting area factor, and processing the luminaire input data signals to obtain a photometry factor. The method also includes processing the lighting area factor and the photometry factor to determine a light level value in the lighting area, and generating a light level output signal based on the light level value determined. The system and method further include a system and method for manipulating data three-dimensionally in a spatial view on a video monitor.

12 Claims, 4 Drawing Sheets

METHOD AND SYSTEM FOR DESIGNING LIGHTING INSTALLATIONS

TECHNICAL FIELD

This invention relates generally to methods and systems for lighting installation design. More particularly, this invention relates to a method and system for designing lighting installations, the method and system for use in conjunction with a computer having a monitor and a memory.

BACKGROUND ART

Design processes associated with many products and facilities are increasingly being adapted for computer implementation. Such computer aided design, or CAD, has proven invaluable in providing both time and cost savings for manufacturers and customers alike.

One industry that has seen an increased use of CAD in recent years is the lighting industry. Many lighting industry products and their components, such as individual luminaires and lighting control circuitry, are now being designed via CAD methods. Indeed, complete lighting installations for physical plant and other facilities may also be designed via CAD methods. As in other industries, the design of such lighting products and facilities via computer has markedly decreased both the time and costs associated therewith.

However, there is a constant and ongoing effort to increase the speed and efficiency of CAD methods in order to further decrease product and facility design time. Moreover, with respect to CAD methods for designing lighting installations specifically, a variety of other problems also exist.

Most prominent among these problems is the inability of such methods to merely update design calculations given only minimal changes to input data. Typical CAD methods for designing lighting installations determine light levels in a lighting area based upon such input data as luminaire numbers, locations and aiming, luminaire photometry, lighting area geometry, and various surface reflectance values. However, even after only minimal input data changes, such methods unnecessarily repeat all design calculations, even those associated with unchanged input data. As a direct result of such design calculation inefficiencies, design time for the lighting installation is needlessly lengthened.

Typical CAD methods for designing lighting installations are also unable to account for any type of obstructions located in the lighting area other than vertical walls or partitions, or horizontal workplanes or surfaces. Thus, obstructions in the form of solid objects or sloped planes must either be approximated or disregarded entirely during design calculations, thereby decreasing the accuracy of the light level values finally determined.

Moreover, typical CAD methods for designing lighting installations fail to discriminate among reflective surfaces within the lighting area based on their relative importance to final light level determinations. That is, rather than concentrate on reflective surfaces that significantly affect final light level determinations, such methods treat all reflective surfaces equally, thereby sacrificing accuracy in final light level determinations.

Finally, such methods, as well as other CAD methods generally, also suffer from an inability to manipulate input data three-dimensionally in spatial views of the product or facility on a computer monitor. That is, in a spatial view of the product or facility, existing CAD methods display a cursor that is capable of only two-dimensional movement in a single, fixed plane. Thus, before a CAD operator may select a three-dimensional location shown in the spatial view, the operator must first switch to a two-dimensional plan view of the product or facility in order to fix one of the three spatial coordinates necessary to select the three-dimensional location.

Thus, an improved method and system for designing lighting installations would further reduce lighting installation design time. Such a method and system would also be capable, in the event of only partial input data changes, of performing only those design calculations related to such changes. In such a manner, the method and system would further reduce lighting installation design time by increasing design calculation efficiency.

An improved method and system for designing lighting installations would also account for a wider variety of lighting area obstructions, such as solid objects or sloped planes, thereby increasing the accuracy of the light level values determined. Such a method and system would also discriminate among reflective surfaces based upon the relative importance of each reflective surface to final light level determinations to again increase the accuracy of the light levels determined. Finally, such a method and system would also be capable of three-dimensional manipulation of input data, such as luminaire numbers and locations, in a spatial view of the lighting area on a computer monitor.

DISCLOSURE OF INVENTION

According to the present invention, a method and system for designing a lighting installation are provided, The method is for use in conjunction with computer having a monitor and a memory and comprises generating lighting area input data signals based on selected parameters associated with a lighting area, and generating luminaire input data signals based on selected parameters associated with a luminaire. The method further comprises processing the lighting area input data signals to obtain a lighting area factor, and processing the luminaire input data signals to obtain a photometry factor. The method still further comprises processing the lighting area factor and the photometry factor to determine a light level value in the lighting area, and generating a light level output signal based on the light level value determined.

The system of the present invention comprises means for generating lighting area input data signals based on selected parameters associated with a lighting area, and means for generating luminaire input data signals based on selected parameters associated with a luminaire. The system further comprises means for processing the lighting area input data signals to obtain a lighting area factor, and means for processing the luminaire input data signals to obtain a photometry factor. The system still further comprises means for processing the lighting area factor and the photometry factor to determine a light level value in the lighting area, and means for generating a light level output signal based on the light level value determined.

Included in the method and system of the present invention are a method and system for manipulating data three-dimensionally in a spatial view on a video monitor. That method comprises displaying a first locator on the monitor, the first locator having first and second display units defining a first display location, and transforming the first and second display units of the first locator to first, second and third spatial coordinates defining a first spatial location of the first locator, the third spatial coordinate being assigned a constant value such that the first locator is capable of movement in a fixed spatial plane defined by the third spatial coordinate. That method further comprises selecting a variable fourth spatial coordinate, and transforming the first, second and fourth spatial coordinates defining a second spatial location to third and fourth display units defining a second display location. That method still further comprises displaying on the monitor a second locator at the second display location, the second locator capable of movement in a variable spatial plane defined by the fourth spatial coordinate and corresponding to movement of the first locator in the fixed spatial plane.

The system for manipulating data three-dimensionally in a spatial view on a video monitor comprises means for displaying a first locator on the monitor, the first locator having first and second display units defining a first display location, and means for transforming the first and second display units of the first locator to first, second and third spatial coordinates defining a first spatial location of the first locator, the third spatial coordinate being assigned a constant value such that the first locator is capable of movement in a fixed spatial plane defined by the third spatial coordinate. That system further comprises means for selecting a variable fourth spatial coordinate, and means for transforming the first, second and fourth spatial coordinates defining a second spatial location to third and fourth display units defining a second display location. That system still further comprises means for displaying on the monitor a second locator at the second display location, the second locator capable of movement in a variable spatial plane defined by the fourth spatial coordinate and corresponding to movement of the first locator in the fixed spatial plane.

Accordingly, it is the principle object of the present invention to provide a method and system for designing a lighting installation having improved efficiency in determining area lighting levels.

Another object of the present invention is to provide a method and system for designing a lighting installation that decreases both initial design and re-design times.

Another object of the present invention is to provide a method and system for designing a lighting installation that determines area lighting levels with improved accuracy, thereby resulting in improved lighting installation efficiency.

Still another object of the present invention is to provide a method and system for designing a lighting installation capable of accounting for an increased variety of lighting area obstructions.

Yet another object of the present invention is to provide a three-dimensional cursor for use in spatial views on computer or video monitors.

These and other objects and advantages will be readily apparent upon consideration of the following description and drawings.

BEST MODE FOR CARRYING OUT THE INVENTION

Figure 1A:
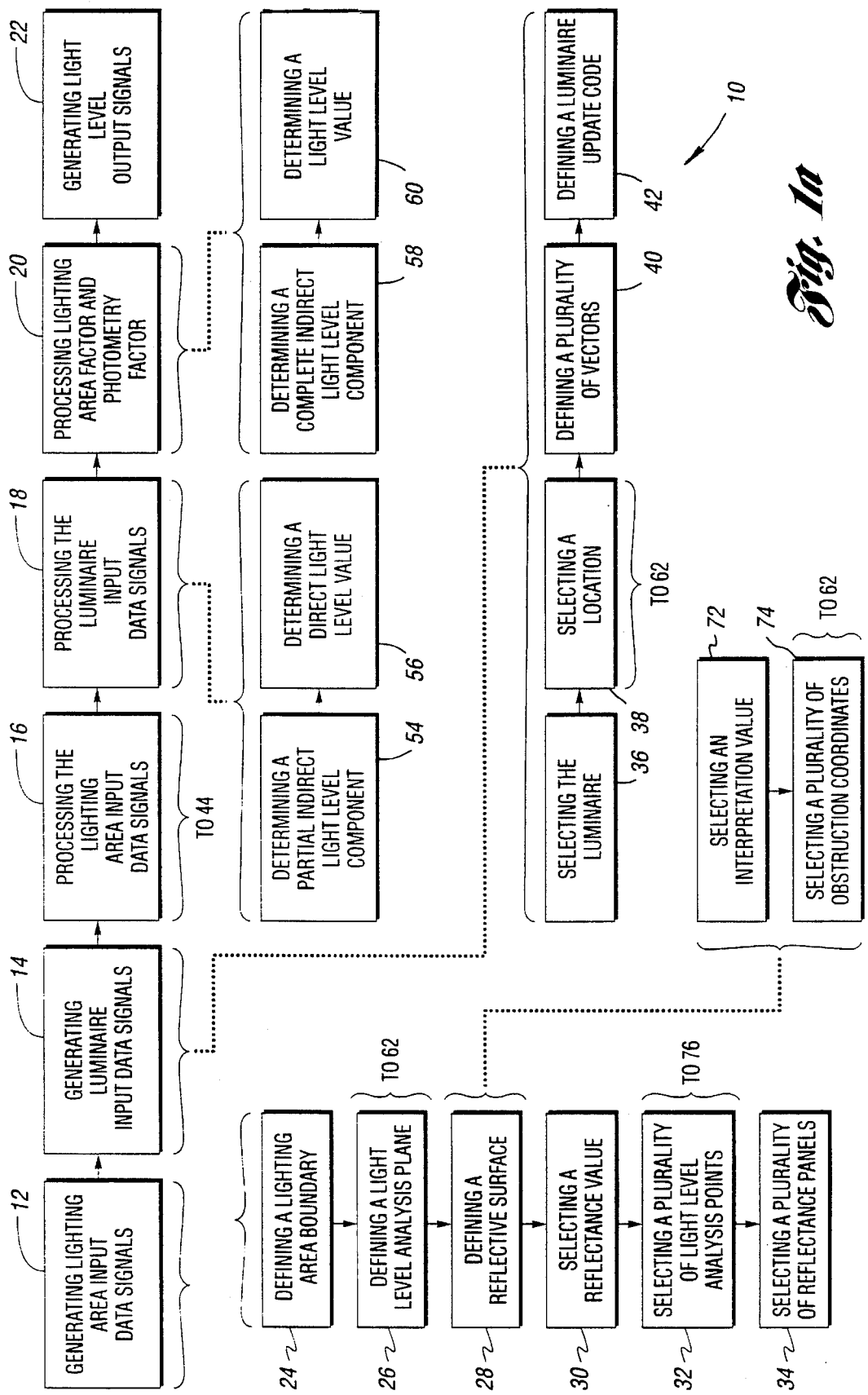
FIGS. 1a and 1b are a block diagram of the method of the present invention.

According to the general aspects of the present invention for lighting installation design, an engineer or designer typically determines the number and placement of luminaires necessary to provide a desired light level in a given lighting area. The required number and placement of luminaires is dependent upon a variety of parameters.

One of the most important of such parameters is the physical geometry, or the dimensions necessary to define the lighting area in question. Where the lighting area is an ordinary parking lot or business office, the physical geometry may be as simple as length and width, or length, width and height dimensions, respectively. However, where the lighting area is a roadway interchange or a large commercial facility, the physical geometry may be considerably more complex.

The task of defining a lighting area has a number of other possible steps associated therewith, depending upon the exact nature of the lighting area. One such step is defining a light level analysis plane. The light level analysis plane is that plane in which light levels over a defined area will be determined. The light level analysis plane is typically that plane in the lighting area at which work will be performed. As a result, the light level analysis plane is often referred to as a workplane. However, the light level analysis plane need not be located within the lighting area.

The definition of a light level analysis plane includes selecting a plurality of light level analysis points within the light level analysis plane. Average light levels and uniformity information for a given light level analysis plane are determined using the individual analysis points in that plane.

The definition of a light level analysis plane also includes selecting a direction, or an orientation, at which the light level will be determined. That is, an orientation must be chosen for a hypothetical light meter placed in the light level analysis plane for the purposes of measuring the light level there. Such a light level orientation may vary anywhere from a parallel orientation (within the light level analysis plane itself), to a more typical perpendicular orientation, to orientations toward or away from specific reference lines or points.

Thus, in an ordinary business office, the light level analysis plane is typically a desktop with a perpendicular light level orientation. In an ordinary parking lot the light level analysis plane is typically the ground, again with a perpendicular light level orientation. With more complex lighting areas, however, there may be multiple light level analysis planes, each having different orientations at which light levels will be determined.

Another step in the task of defining a lighting area is that of defining reflective surfaces. That is, in defining an ordinary business office as the lighting area, six reflective surfaces are also typically defined, namely four walls, a ceiling and a floor. In defining an ordinary parking lot as the lighting area, only a single reflective surface is typically defined, namely the ground. Just as with dimensions, the number of reflective surfaces increases and their shapes become more complicated as lighting areas become more complex.

Defining reflective surfaces may include defining any obstructions that exist within the lighting area. Such obstructions may be solid objects, such as machinery, buildings or overpasses. However, such obstructions may also be planes of varying slopes, such as partitions, tables or hills. The more accurately such obstructions can be modeled, the more accurate final light level determinations in the light level analysis plane will be.

Still another step in defining a lighting area is that of selecting surface reflectance values and reflectance panels. More specifically, every surface associated with the lighting area, such as obstruction surfaces, inter-reflects light within the lighting area to a greater or lesser degree. The extent of such inter-reflectance can be accounted for by assigning each such surface a reflectance value and dividing each surface into a plurality of reflectance panels, each reflectance panel being represented by a point at its center, based upon the degree of reflectance associated with each surface and the proximity of each surface to the light level analysis plane. Thus, the closer the reflective surface is to the light level analysis plane, the finer the surface is divided into reflectance panels to be used in determining final light levels.

Two other equally important parameters affecting the design of lighting installations are the photometric data and physical locations of the desired luminaires. More specifically, each type of luminaire has unique photometric data associated therewith, such as light intensity, light loss, lumens and distribution. As is readily apparent, the specific locations of the luminaires intimately affect light levels in the lighting area. As used herein, in addition to planar coordinates and a mounting height, the location of a luminaire also includes the angles at which the luminaire is aimed and oriented.

As described above, the present invention generally involves determining the number and placement of luminaires necessary to provide a desired light level in a given lighting area. As is readily apparent, however, any of these basic elements, as well as the specific parameters associated therewith, may be treated as variables to be determined according to the present invention.

In any event, light level determinations are made according to the well known lighting industry formulas. For the purposes of obtaining a preliminary, approximate light level determination over an area involving multiple luminaires, the following industry formula may be used:

$$ILL=(luminaires)(lumens/luminaire)(CU)(LLF)/area$$

This formula states that the light level, or illumination (ILL), in the light level analysis plane, measured in footcandles, is equal to the product of the number of luminaires, the number of lumens per luminaire, the coefficient of utilization (CU) of the luminaire, and the light loss factor (LLF) of the luminaire, divided by the area of the light level analysis plane.

For final light level determinations, however, the following industry formula is used:

$$ILL=I(\cos\theta)/D^2$$

Figure 2:
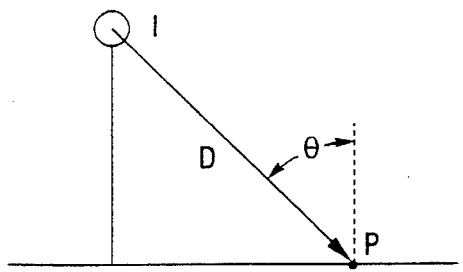
FIG. 2 is a graphic illustration of luminaire parameters used in the present invention.

This formula, graphically illustrated in FIG. 2, states that the light level, or illumination, at a light level analysis point (P), measured in footcandles, is equal to the product of the light intensity from the luminaire (I) and the cosine of the incident angle ($\theta$), divided by the squared distance (D) from the luminaire to the light level analysis point. As previously stated, average light levels for a given light level analysis plane are determined using the individual light level analysis points defined in that light level analysis plane.

Figure 1B:
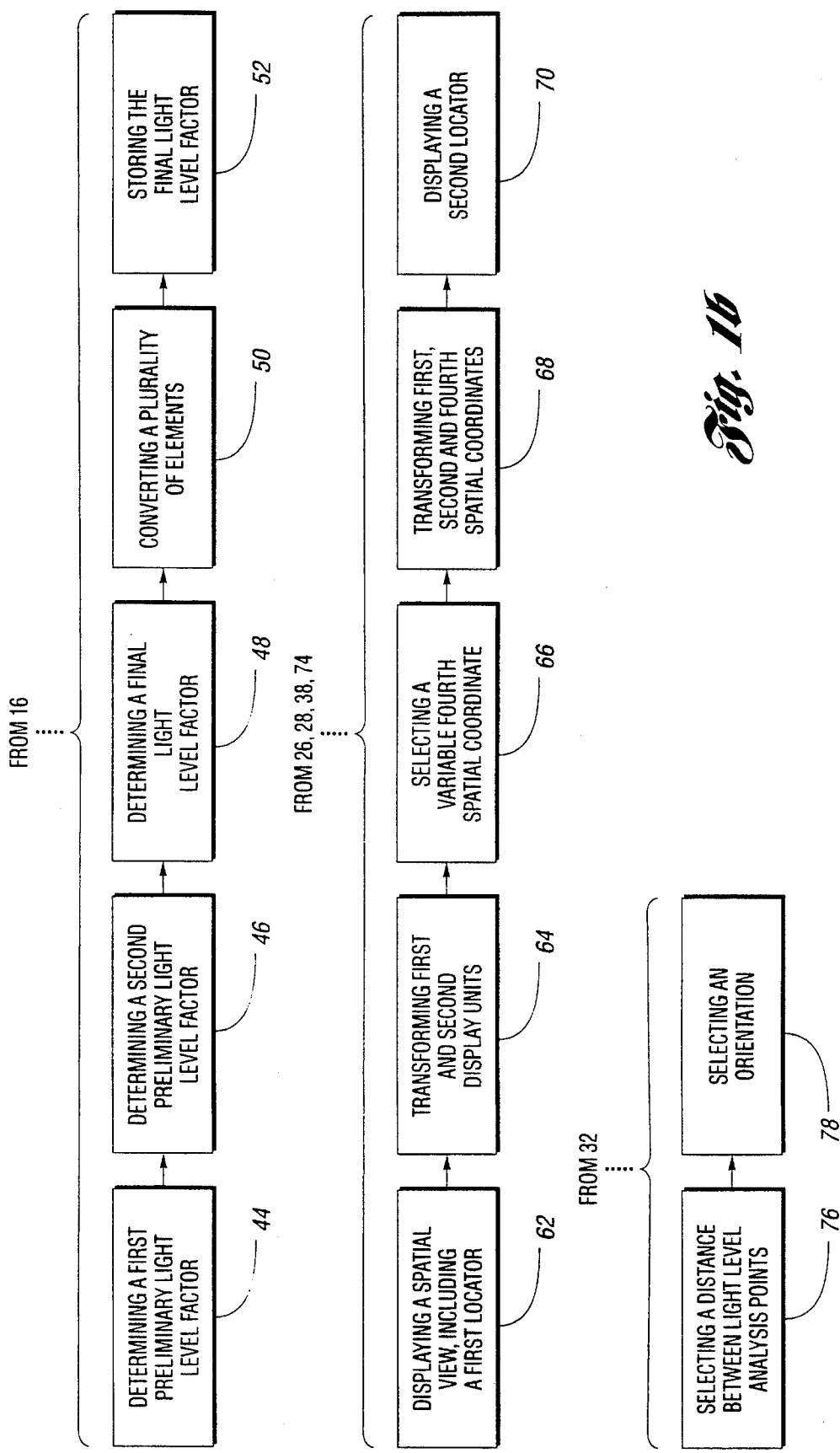

Referring now to FIGS. 1a and 1b, the method of the present invention for designing lighting installations in conjunction with a computer having a monitor and a memory is shown in block diagram form, denoted generally by the reference numeral 10. The method (10) comprises generating (12) lighting area input data signals based on selected parameters associated with a lighting area, and generating (14) luminaire input data signals based on selected parameters associated with a luminaire. The method (10) further comprises processing (16) the lighting area input data signals to obtain a lighting area factor, and processing (18) the luminaire input data signals to obtain a photometry factor. The method (10) still further comprises processing (20) the lighting area factor and the photometry factor to determine a light level value in the lighting area, and generating (22) a light level output signal based on the light level value determined.

The method (10) of the present invention also includes converting the lighting area input data signals and the luminaire input data signals from analog to digital form, storing in memory the lighting area input data signals and the luminaire data input signals, and storing in memory the light level value determined. The method (10) also includes retrieving from memory the lighting area input data signals and the luminaire input data signals, and retrieving from memory the light level value determined. The method (10) further includes converting the light level value determined from digital to analog form, and generating the light level output signal in analog form.

Generating (12) lighting area input data signals itself comprises defining (24) a lighting area boundary, and defining (26) a light level analysis plane. As previously described, defining (24) a lighting area boundary depends upon those dimensions necessary to define the lighting area. According to the present invention, multiple lighting areas may be defined and analyzed simultaneously. As also described previously, defining (26) a light level analysis plane may depend upon the workplane or workplanes involved.

Generating (12) lighting area input data signals also comprises defining (28) a reflective surface, and selecting (30) a reflectance value for the reflective surface. As previously described, defining (28) a reflective surface depends upon the nature of the lighting area. More specifically, an indoor lighting area will typically have more reflective surfaces, such as walls and a ceiling, than an outdoor lighting area.

With respect to selecting (30) a reflectance value for the reflective surface, the method (10) of the present invention provides for reflectance values from zero to 99. A surface having a reflectance value of zero is treated by the computer as transparent. Such a surface could be a window or, more typically, a non-existent "surface" or open space. A surface having a reflectance value of one is treated by the computer as opaque and completely non-reflective. Finally, a surface having a reflectance value anywhere from two to 99 is treated by the computer as opaque, but with an increasing degree of reflectance such that a surface reflectance of 99 denotes a highly reflective diffuse surface. Overall design calculation time will be reduced for each surface within the lighting area having a reflectance value of zero or one, since these surfaces are not represented with smaller reflectance panels as are surfaces that reflect light back into the lighting area.

Generating (12) lighting area input data signals also comprises selecting (32) a plurality of light level analysis points on the light level analysis plane, as well as selecting (34) a plurality of reflectance panels in the reflective surface, each reflectance panel having a reflectance value equal to the reflectance value selected for the reflective surface. With respect to selecting (34) a plurality of reflectance panels in the reflective surface, each reflective surface in the lighting area is divided into a group of discrete panels, each panel being represented by a point at its center, so that design calculations may be conducted on a finite element analysis basis. Moreover, the method (10) of the present invention performs this discretization selectively. That is, as will be described in more detail below, the present invention discriminates among reflective surfaces based on the effect such surfaces have on a final light level determination.

In such a fashion, by increasing or decreasing the number of surface reflectance panels, both the complexity and accuracy of the design calculations, as well as overall design time, may be increased or decreased. Likewise, the number of light level analysis points selected in the light level analysis plane also affects overall design time. However, light level analysis points must be selected so that light levels may be accurately represented given luminaire spacing.

Still referring to FIG. 1, generating (14) luminaire input data signals itself comprises selecting (36) the luminaire, the luminaire having standard photometric data associated therewith, and selecting (38) a location for the luminaire in the lighting area. As used herein, selecting (38) a location for the luminaire includes determining spatial coordinates for the luminaire, determining aiming and orientation angles for the luminaire, relocating a previously selected luminaire within the lighting area, adding a luminaire of the same or different type to the lighting area, deleting a luminaire from the lighting area, changing the aiming and/or orientation angles of a luminaire in the lighting area, or any combination thereof.

Generating (14) luminaire input data signals further comprises defining (40) a plurality of vectors representing the standard photometric data associated with the luminaire. In typical CAD methods for designing lighting installations, the standard photometric data associated with a particular luminaire is formatted according to standards promulgated by the Illumination Engineering Society of North America, or IESNA. In the present invention, however, conversion of such data from the standard IESNA format to a plurality of vectors, or a "calculation ready format", decreases computer memory space necessary for storage and further decreases design calculation time. The plurality of vectors typically contain such information as numbers of lamps, lumens per lamp, candela factors, ballast factors, input wattage, luminaire tilt, vertical and horizontal angles, luminous flux, and spill light.

Generating (14) luminaire input data signals further comprises defining (42) a luminaire update code based on the plurality of vectors representing the standard photometric data associated with the luminaire. In the present invention, the update code preferably includes an address in computer memory for each luminaire. At each such address there is stored, for all the analysis points involved, the luminaire distance, angle of incidence, horizontal and vertical angles, and resulting illumination.

The update code for the method (10) of the present invention also preferably includes a four bit binary number which indicates, depending on the specific combination of bits, those portions of the luminaire input data that remain unchanged. The four bit binary number thus indicates which steps of the method (10) need not be undertaken in any re-determination of a final light level in the lighting area, thereby decreasing overall design time through more efficient use of computer resources.

According to the present invention, where the most significant bit of the four bit binary number of the update code is a binary "1", all quantities associated with the luminaire are recalculated. Where the next least significant bit is a binary "1", horizontal and vertical angles associated with the luminaire, as well as resulting illumination are recalculated based on existing distance and incidence angle information. Where the next least significant bit is a binary "1", the resulting illumination is recalculated based on existing horizontal and vertical angle, distance, and incidence angle information, as well as photometry associated with a new luminaire. Finally, where the least significant bit is a binary "1", the direct illumination component from the luminaire will be subtracted from the final light level value determination.

Figure 3:
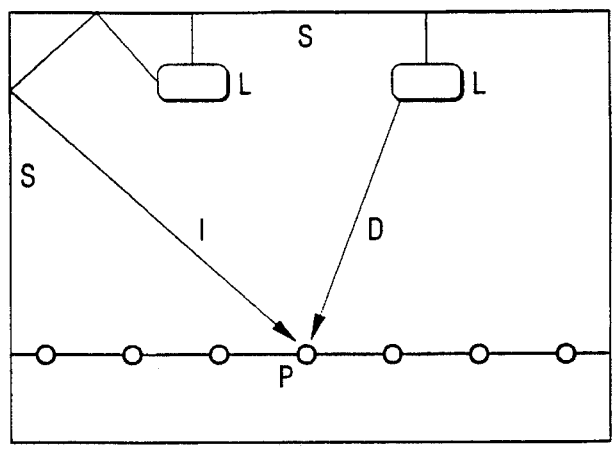
FIG. 3 is a graphic illustration of light level components used in the present invention.

Referring now to FIG. 3, a graphic illustration of light level components used in the present invention is shown. It is well known in the art that light arrives at each light level analysis point (P) in the light level analysis plane both directly (D) from each luminaire (L), as well as indirectly (I) from each of the reflective surfaces (S). Total illumination in the light level analysis plane is therefore equal to the sum of the light from each reflective surface to the light level analysis plane, and the light directly from each luminaire to the light level analysis plane.

Typical CAD methods for designing lighting installations determine each of these factors every time a change of any type is made, however minor, to input data such as luminaire types or locations. In so doing, such CAD methods needlessly repeat many design calculations and increase overall lighting installation design time.

According to the present invention, however, the light inter-reflected between each reflective surface and the light from each reflective surface to the light level analysis plane are pre-processed, based on a pre-selected unit of light (typically one footcandle) and selected parameters of the lighting area to obtain a lighting area factor. The present invention utilizes this lighting area factor to avoid having to re-determine the light inter-reflected between each reflective surface, and the light from each reflective surface to the light level analysis plane every time changes are made to only the types, numbers, or locations of luminaries in the lighting area.

In such a fashion, the present invention decreases overall lighting installation design time where only slight changes are made to input data such as luminaire types or locations. It is readily apparent, however, that changes to input data such as obstruction locations or lighting area dimensions affect the fundamental nature of the lighting area. In such cases, the light inter-reflected between each reflective surface and the light from each reflective surface to the light level analysis plane must be re-determined.

As previously described, the light level analysis plane is defined by a group of discrete light level analysis points, and the reflective surfaces are each defined by a group of discrete surface reflectance panels represented by a point at the center thereof. According to the present invention, the light inter-reflected between each reflective surface and the light from each reflective surface to the light level analysis plane is expressed as a matrix whose size is determined by the number of surface reflectance panels, and the sum of the number of surface reflectance panels and the number of light level analysis points, respectively.

In this regard, referring again to FIG. 1, processing (16) the lighting area input data signals itself comprises determining (44) a first preliminary light level factor based on inter-reflectance between the plurality of reflectance panels in the reflective surface given a preselected unit of light, and determining (46) a second preliminary light level factor based on reflectance from the plurality of reflectance panels in the reflective surface to the plurality of light level analysis points on the light level analysis plane given the preselected unit of light. Processing (16) the lighting area input data signals further comprises determining (48) a final light level factor based on the first and second preliminary light level factors.

Thus, in the preferred embodiment of the present invention, the final light level factor is a matrix having a plurality of elements. Depending upon the complexity of the lighting area involved, such a matrix can become quite large. As a result, to reduce storage space necessary for the final light level factor, processing (16) the lighting area input data signals further comprises converting (50) each of the plurality of elements of the final light level factor to a one byte character, and storing (52) in memory the final light level factor in the form of the one byte characters.

In the present invention, most of the elements making up the final light factor have floating point values less than 0.000001. As a result, converting (50) each of the plurality of elements of the final light level factor to a one byte character is preferably accomplished by taking the tenth root of the floating point value of the element and then rounding the result to the nearest integer. The resulting integer is then assigned to one of 256 alpha-numeric characters available on a computer.

The 256 alpha-numeric characters are the equivalent of $2^8$ combinations of an eight bit binary number. As a result, each alpha-numeric character representing an element of the final light level factor may be conveniently stored in one byte of computer memory. By reversing this process, the final light level factor can be re-converted to floating point values. Thus, each element of the final light level factor is stored with an accuracy of one part in 256 using only one, instead of eight, bytes of memory per element, thereby reducing the amount of memory necessary to implement the present invention and making more efficient use of computer resources.

Moreover, based on the final light level factor, it can be determined which of the reflective surfaces will have a greater or lesser effect on final light level determination. In response, each reflective surface may be selectively divided into reflectance panels to a greater or lesser degree, respectively. In so doing, the present invention increases the accuracy of the final light level determination, as well as decreases overall design time through more efficient use of computational resources.

More specifically, each reflective surface is first divided into either four panels or a number of 20 feet×20 feet panels, whichever is greater. A point is then assigned to the center of each resulting panel to represent that panel. As previously described, each reflectance panel has a reflectance value equal to the reflectance value selected for the reflective surface of which the reflectance panel is a part.

Thereafter, as described above, a final light level factor is determined based on the reflectance panels in each of the reflective surfaces and the light level analysis points in the light level analysis plane. Once again, as previously described, the final light level factor is a matrix of elements whose size is determined by the number of reflectance panels and the number of analysis points, respectively.

Next, a maximum vector is defined comprising the maximum element value for each reflectance panel. Thus, the maximum vector has a length equal to the number of reflectance panels in the lighting area and shows the greatest effect that each reflectance panel has on at least one analysis point. Where the maximum element value for a given reflectance panel exceeds a selected threshold value, the reflectance panel is further sub-divided to create additional reflectance panels.

The threshold value for further sub-dividing reflective surface panels is determined empirically by weighing final light level determination accuracy requirements against available computer resources. That is, a low threshold value could be selected such that a given reflective surface panel is sub-divided into one foot×one foot panels. This would provide a very accurate final light level determination, but would exceed the memory capacity of most minicomputers and would take days to process. Conversely, a high threshold value could be selected so as to prevent further sub-division of even the nearest reflective surface panel. This would provide a very quick final light level determination, but at the expense of accuracy.

In the preferred embodiment of the present invention, a number of threshold values are selected ranging from six to 600. The maximum vector is then multiplied by 10,000 and each of its elements are compared to the threshold values. Where a multiplied element of the maximum vector is six or lower, the corresponding reflectance panel is not further sub-divided. Where a multiplied element of the maximum vector is 600 or greater, the corresponding reflectance panel is sub-divided into one foot×one foot panels. For multiplied elements of the maximum vector between six and 600, sub-division of the corresponding reflectance panel increases as the value of the multiplied element increases.

As a result, reflective surfaces close to the light level analysis plane that have a more significant impact on final light level determinations are assigned a greater number of reflectance panels to improve the accuracy of final light level determinations. That is, the number of reflectance panels on a reflective surface is inversely related to the distance between the reflective surface and the light level analysis plane.

Thereafter, another final light level factor is determined. Such a final light level factor is again a matrix of elements whose size is determined by the revised number of reflectance panels and the number of light level analysis points, respectively. This final light level factor may then be utilized for the remaining implementation of the present invention. In such a fashion, computer resources are focused on the most significant reflective surfaces, rather than on some distant and substantially irrelevant reflective surface of the lighting area.

Still referring to FIG. 1, the method (10) of the present invention determines the light from each luminaire to each reflective surface and the light from each luminaire direct to the light level analysis plane by processing (18) the luminaire input data signals. Processing (18) the luminaire input data signals comprises determining (54) a partial indirect light level component based on the luminaire location, the luminaire update code, and the reflectance panels in the reflective surface. Such a partial indirect light level component thus corresponds to the light from each luminaire to each reflective surface as described above. Processing (18) the luminaire input data signals also comprises determining (56) a direct light level component based on the luminaire location, the luminaire update code, and the light level analysis points. Such a direct light level component thus corresponds to the light from each luminaire direct to the light level analysis plane as described above.

Processing (20) the lighting area factor and the photometry factor itself comprises determining (58) a complete indirect light level component based on the final light level factor and the partial indirect light level component. As with the light inter-reflected between each reflective surface and the light from each reflective surface to the light level analysis plane (represented by the final light level factor), in the present invention both the light from each luminaire to each reflective surface (represented by the partial indirect light level component) and the light from each luminaire direct to the light level analysis plane (represented by the direct light level component) are also expressed as matrices. The size of each of these matrices is determined by the luminaire location and update code, as well as the number of reflectance panels in the reflective surfaces, and the sum of the number of reflectance panels in the reflective surfaces and the number of light level analysis points, respectively.

In this regard, the light inter-reflected between each reflective surface is applied to the light from each luminaire to the reflective surfaces to obtain a total indirect illumination. More particularly, the matrix corresponding to the final light level factor is applied to the matrix corresponding to the partial indirect light level component to obtain a matrix corresponding to the complete indirect light level component.

Finally, processing (20) the lighting area factor and the photometry factor also comprises determining (60) a light level value based on the complete indirect and direct light level components. More particularly, the matrix corresponding to the complete indirect light level component is applied to the matrix corresponding to the direct light level component.

The design of a lighting installation, as well as any other type of computer aided design, is a three-dimensional process. With lighting installation design, both location and aiming coordinates of luminaires vary freely in three-dimensions. As a result, the engineer or designer should preferably be able to interrogate a spatial view of the lighting area on a computer monitor in three-dimensions.

However, the display of the lighting area spatial view on the computer monitor is inherently two-dimensional. To provide for three-dimensional interrogation of this inherently two-dimensional display, the present invention employs two cursors. The first cursor, or locator, has a pair of display coordinates defining a first display location on the monitor. These display coordinates are transformed to three spatial coordinates in the spatial view of the lighting area via a three-dimensional transform wherein the first cursor is assigned a constant spatial elevation, typically zero. The first cursor is thus capable of moving freely in the fixed spatial plane defined by that elevation. In such a fashion, two-dimensional data is transformed to three-dimensions.

The second cursor, or locator, is assigned the same horizontal and vertical spatial coordinates as the first cursor. However, the second cursor is capable of moving freely in a variable spatial plane defined by a selected spatial elevation. To display this second cursor on the monitor, the three spatial coordinates of the second cursor are transformed via a three-dimensional transform to a pair of display coordinates defining a second display location. In such a fashion, three-dimensional data is transformed to two-dimensions.

Referring again to FIG. 1 then, according to the present invention, defining (26) a light level analysis plane, defining (28) a reflective surface, and selecting (38) a location for the luminaire may each themselves comprises displaying (62) a spatial view of the lighting area, the spatial view including a first locator having first and second display units defining a first display location, and transforming (64) the first and second display units of the first locator to first, second and third spatial coordinates defining a first spatial location of the first locator, the third spatial coordinate being assigned a constant value such that the first locator is capable of movement in a fixed spatial plane defined by the third spatial coordinate.

Defining (26) a light level analysis plane, defining (28) a reflective surface, and selecting (38) a location for the luminaire may each further comprise selecting (66) a variable fourth spatial coordinate, and transforming (68) the first, second and fourth spatial coordinates defining a second spatial location to third and fourth display units defining a second display location. Defining (26) a light level analysis plane, defining (28) a reflective surface, and selecting (36) a location for the luminaire each still further comprise displaying (70) a second locator at the second display location, the second locator capable of movement in a variable spatial plane defined by the fourth spatial coordinate and corresponding to movement of the first locator in the fixed spatial plane.

In such a fashion, the present invention provides a cursor capable of manipulating data in three-dimensions. Such a "three-dimensional cursor" allows a lighting installation engineer or designer to select a three-dimensional point in a perspective view of the lighting area for any purpose, such as locating a luminaire, or defining a reflective surface or a light level analysis plane. More specifically, an engineer or designer may define a location in three-dimensional space without first having to select a two-dimensional plan view in order to fix one of the three coordinates necessary to define the three-dimensional location.

Still referring to FIG. 1, defining (28) a reflective surface may itself comprise selecting (72) an interpretation value to define an obstruction based on a desired obstruction shape and orientation, and selecting (74) a plurality of obstruction coordinates. According to the present invention, four interpretation values are available for defining a lighting area obstruction. One of the four interpretation values defines a vertical plane, such as a wall or partition, having a surface on either side thereof. Another of the four interpretation values defines an orthogonal cube, such as a building, desk or room, having six interior and six exterior surfaces associated therewith.

For the purposes of describing the remaining two interpretation values and the obstructions associated therewith, assume a cartesian coordinate system where the X and Y axes lie in, and the Z axis is normal to, the plane of the paper. With such a coordinate system, one of the remaining two interpretation values defines a generally horizontal plane sloping either from left to right or right to left about the Y axis, while the other defines a generally horizontal plane sloping either from front to back or back to front about the X axis. Each of these types of generally horizontal planar obstructions has a surface on either side thereof.

According to the present invention, to complete the definition of the desired obstruction, at least two three-dimensional points must be selected after selection of an interpretation value. In this regard, where the obstruction to be defined is a vertical plane, the two three-dimensional points selected are interpreted to be the opposite corners of the surface. In such a manner, the vertical surface may be given both the length and height desired.

Similarly, where the obstruction to be defined is a generally horizontal plane, the two three-dimensional points selected are also interpreted to be the opposite corners of the surface. In such a manner, the horizontal surface may be given the length, width and slope desired. Finally, where the obstruction to be defined is an orthogonal cube, the two three-dimensional points selected are again interpreted to be the opposite corners thereof. In such a manner, the cube may be given the length, width and height desired.

As with defining (26) a light level analysis plane, defining (28) a reflective surface, and selecting (36) a location for the luminaire, selecting (74) a plurality of obstruction coordinates may also be accomplished utilizing a three-dimensional cursor. More specifically, selecting (74) a plurality of obstruction coordinates may itself comprise displaying (62) a spatial view of the lighting area, the spatial view including a first locator having first and second display units defining a first display location, and transforming (64) the first and second display units of the first locator to first, second and third spatial coordinates defining a first spatial location of the first locator, the third spatial coordinate being assigned a constant value such that the first locator is capable of movement in a fixed spatial plane defined by the third spatial coordinate.

Selecting (74) a plurality of obstruction coordinates may further comprise selecting (66) a variable fourth spatial coordinate, transforming (68) the first, second and fourth spatial coordinates defining a second spatial location to third and fourth display units defining a second display location, and displaying (70) a second locator at the second display location, the second locator capable of movement in a variable spatial plane defined by the fourth spatial coordinate and corresponding to movement of the first locator in the fixed spatial plane.

Finally, still referring to FIG. 1, selecting (32) a plurality of light level analysis points itself comprises selecting (76) a distance between adjacent light level analysis points. Selecting (32) a plurality of light level analysis points also comprises selecting (78) an orientation for a light level determination at the light level analysis points. As previously described, the orientation for a light level determination at the light level analysis points is typically perpendicular to the light level analysis plane, but may be varied to aim toward or away from specific reference points or lines, or have any defined orientation and tilt from nadir. As also previously described, the number of light level analysis points to be selected depends upon the number of luminaires and the luminaire spacing desired.

According to the present invention, determining (58) a complete indirect light level component based on the final light level factor and the partial indirect light level component may be repeated. Such iteration, preferably on the order of five times or more, further enhances the accuracy of the light level value finally determined. As previously described, after changes to the luminaire input data, the present invention utilizes the update code assigned each luminaire so that processing the luminaire input data signals to obtain a photometry factor is performed only where necessary. In such a fashion, the present invention is more efficient than typical CAD methods for designing lighting installations and further decreases overall design time.

Figure 4:
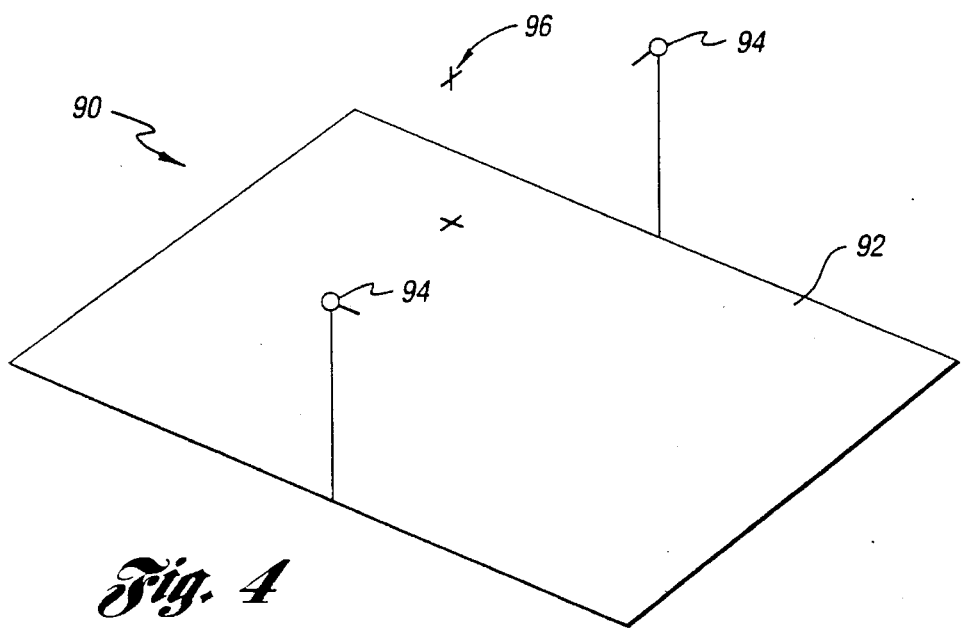
FIG. 4 is a perspective view of a spatial display from a computer monitor of a simple outdoor lighting installation designed according to the present invention, showing a three-dimensional cursor as used therein.

Referring now to FIG. 4, a perspective view of a spatial display from a computer monitor of a simple outdoor lighting installation designed according to the present invention is shown. As seen therein, a lighting area (90) is defined by an ordinary parking lot, its surface corresponding to a light level analysis plane (92). A pair of luminaires (94) are located on either side and at a certain mounting height above the light level analysis plane (92). A three-dimensional cursor (96) is provided for adding, deleting or moving luminaires (94) at or to other locations within the lighting area (90).

Figure 5:
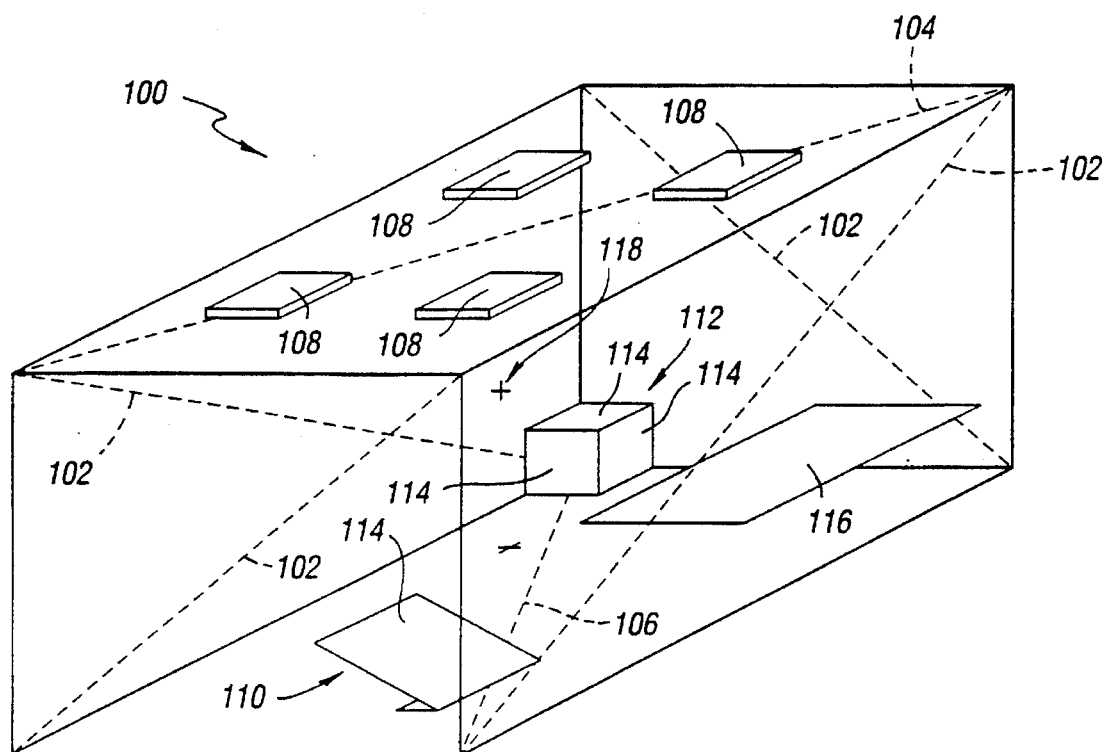
FIG. 5 is a perspective view of a spatial display from a computer monitor of a simple indoor lighting installation designed according to the present invention, showing a three-dimensional cursor as used therein.

Referring now to FIG. 5, a perspective view of a spatial display from a computer monitor of a simple indoor lighting installation designed according to the present invention is shown. As seen therein, a lighting area (100) is defined by an ordinary business office in the shape of an orthogonal cube. The interior surfaces of the lighting area (100) define six reflective surfaces, four walls (102), a ceiling (104) and a floor (106). Each of the reflective surfaces (102, 104, 106) has its own reflectance value.

Within the lighting area (100) are four luminaires (108) located at the ceiling (104) of the office. Also within the lighting area (100) are a sloped plane obstruction (110), representing a chair, and an orthogonal cube obstruction (112), representing a file cabinet. Each obstruction (110, 112) has at least one reflective surface (114). Finally, a light level analysis plane (116) is also shown, representing a desktop level workplane. As in FIG. 2, a three-dimensional cursor (118) is also provided for adding, deleting or moving luminaires (108) and obstructions (110, 112) at or to other locations within the lighting area (100).

Figure 6:
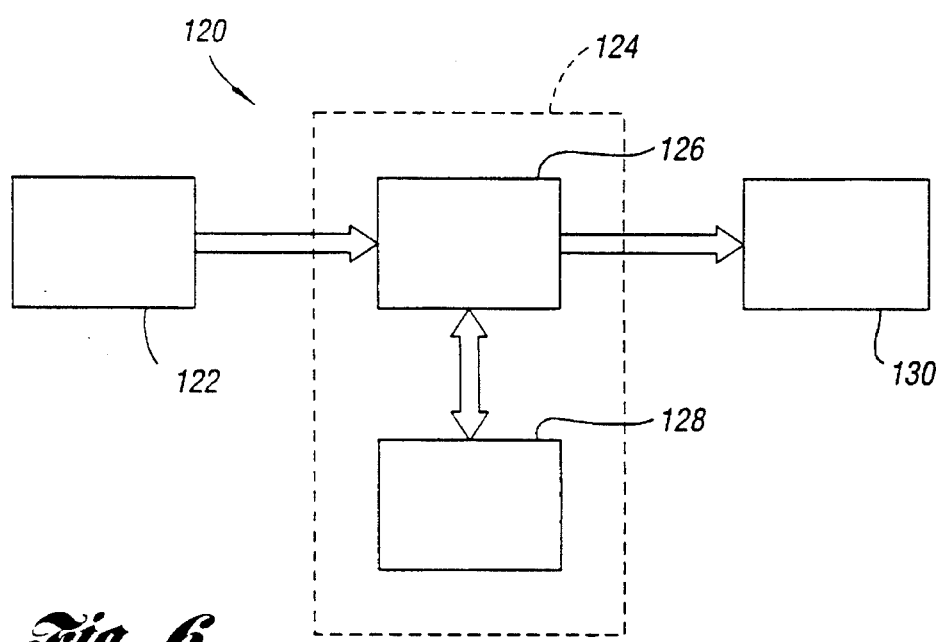
FIG. 6 is simplified schematic of the system of the present invention.

Referring finally to FIG. 6, a simplified schematic of the system of the present invention is shown, denoted generally by reference numeral 120. The system (120) comprises an input data signal generator (122) in electrical communication with a computer (124). The input data signal generator (122) may be any of a number of conventional means for entering data into a computer, such as a keypad, mouse, CAD transfer file, or digitizer tablet.

The computer (124) includes a central processing unit (CPU) (126) in electrical communication with a memory (128). The computer (124) is also in electrical communication with a monitor (130). The CPU (126) of the computer (124) contains a lighting installation design program. That program, together with the input data signal generator (122), CPU (126), memory (128), and monitor (130) variously provide the means for implementing the method (10) of the present invention as described in detail above.

The method (10) and system (120) of the present invention have been described and shown herein in conjunction with the design of lighting installations. However, it should be readily apparent that the method (10) and system (120) of the present invention are suitable for use in any application where pre-processing of data may be required in order to decrease overall design time, or where three-dimensional cursoring may be required in any type of spatial view on a video monitor.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. A method for use in designing a lighting installation, the method for use with a computer having a processor, a monitor, and a data acquisition device, the method comprising:

generating lighting area input data signals via the data acquisition device based on selected parameters associated with a lighting area, generating lighting area input data signals including
    defining a lighting area boundary,
    defining a light level analysis plane,
    defining a reflective surface,
    selecting a reflectance value for the reflective surface, and
    selecting a plurality of reflectance panels in the reflective surface via the data acquisition device, each reflectance panel represented by a reflectance point and having a reflectance value equal to the reflectance value selected for the reflective surface;
generating luminaire input data signals via the data acquisition device based on selected parameters associated with a luminaire, generating luminaire input data signals including
    selecting the luminaire, the luminaire having standard photometric data associated therewith,
    selecting a location for the luminaire in the lighting area,
    defining a plurality of vectors representing the standard photometric data associated with the luminaire, and
    defining a luminaire update code based on the plurality of vectors representing the standard photometric data associated with the luminaire;
processing the lighting area input data signals to obtain a lighting area factor;
processing the luminaire input data signals to obtain a photometry factor;
processing the lighting area factor and the photometry factor to determine a light level value in the lighting area; and
generating via the processor and the monitor a light level output signal based on the light level value determined.

2. The method of claim 1 wherein the number of reflectance panels in the reflective surface is inversely related to the distance between the reflective surface and the light level analysis plane.

3. The method of claim 1 wherein processing the lighting area input data signals comprises:
    determining a first preliminary light level factor based on inter-reflectance between the plurality of reflectance panels in the reflective surface given a preselected unit of light;
    determining a second preliminary light level factor based on reflectance from the plurality of reflectance panels in the reflective surface to the plurality of light level analysis points on the light level analysis plane given the preselected unit of light; and
    determining a final light level factor based on the first and second preliminary light level factors.

4. The method of claim 3, the final light level factor having a plurality of elements, wherein processing the lighting area input data signals further comprises:
    converting each of the plurality of elements of the final light level factor to a one byte character; and
    storing in memory the final light level factor in the form of the one byte characters.

5. The method of claim 3 wherein processing the luminaire input data signals comprises:
    determining a partial indirect light level component based on the luminaire location, the luminaire update code, and the reflectance panels in the reflective surface; and
    determining a direct light level component based on the luminaire location, the luminaire update code, and the light level analysis points.

6. The method of claim 5 wherein processing the lighting area factor and the photometry factor comprises:
    determining a complete indirect light level component based on the final light level factor and the partial indirect light level component; and
    determining a light level value based on the complete indirect and direct light level components.

7. A system for use in designing a lighting installation, the system comprising:
    means for generating lighting area input data signals based on selected parameters associated with a lighting area, the means for generating lighting area input data signals including
        means for defining a lighting area boundary,
        means for defining a light level analysis plane,
        means for defining a reflective surface,
        means for selecting a reflectance value for the reflective surface, and
        means for selecting a plurality of reflectance panels in the reflective surface, each reflectance panel represented by a reflectance point and having a reflectance value equal to the reflectance value selected for the reflective surface;
    means for generating luminaire input data signals based on selected parameters associated with a luminaire, the means for generating luminaire input data signals including
        means for selecting the luminaire, the luminaire having standard photometric data associated therewith,
        means for selecting a location for the luminaire in the lighting area,
        means for defining a plurality of vectors representing the standard photometric data associated with the luminaire, and
        means for defining a luminaire update code based on the plurality of vectors representing the standard photometric data associated with the luminaire;
    means for processing the lighting area input data signals to obtain a lighting area factor;
    means for processing the luminaire input data signal to obtain a photometry factor;
    means for processing the lighting area factor and the photometry factor to determine a light level value in the lighting area; and
    means for generating a light level output signal based on the light level value determined.

8. The system of claim 7 wherein the number of reflectance panels in the reflective surface is inversely related to the distance between the reflective surface and the light level analysis plane.

9. The system of claim 7 wherein the means for processing the lighting area input data signals comprises:
    means for determining a first preliminary light level factor based on inter-reflectance between the plurality of reflectance panels in the reflective surface given a preselected unit of light;
    means for determining a second preliminary light level factor based on reflectance from the plurality of reflectance panels in the reflective surface to the plurality of light level analysis points on the light level analysis plane given the preselected unit of light; and
    means for determining a final light level factor based on the first and second preliminary light level factors.

10. The system of claim 9, the final light level factor having a plurality of elements, wherein the means for processing the lighting area input data signals further comprises:

means for converting each of the plurality of elements of the final light level factor to a one byte character; and means for storing the final light level factor in the form of the one byte characters.

11. The system of claim 9 wherein the means for processing the luminaire input data signals comprises:

means for determining a partial indirect light level component based on the luminaire location, the luminaire update code, and the reflectance panels in the reflective surface; and means for determining a direct light level component based on the luminaire location, the luminaire update code, and the light level analysis points.

12. The system of claim 11 wherein the means for processing the lighting area factor and the photometry factor comprises:

means for determining a complete indirect light level component based on the final light level factor and the partial indirect light level component; and means for determining a light level value based on the complete indirect and direct light level components.

* * * * *